(12) United States Patent
Broden et al.

(10) Patent No.: US 6,782,754 B1
(45) Date of Patent: Aug. 31, 2004

(54) PRESSURE TRANSMITTER FOR CLEAN ENVIRONMENTS

(75) Inventors: David A. Broden, Andover, MN (US); A. Stanley Joseph, Singapore (SG)

(73) Assignee: Rosemount, Inc., Eden Prairie, MN (US)

(*) Notice: Subject to any disclaimer, the term of this patent is extended or adjusted under 35 U.S.C. 154(b) by 437 days.

(21) Appl. No.: 09/611,420

(22) Filed: Jul. 7, 2000

(51) Int. Cl.[7] .............................................. G01L 9/00
(52) U.S. Cl. ........................................................ 73/753
(58) Field of Search ........................... 73/753, 716, 706, 73/728, 756, 720, 718, 724, 715; 228/124.6; 600/561

(56) References Cited

U.S. PATENT DOCUMENTS

| | | | |
|---|---|---|---|
| 3,461,416 A | 8/1969 | Kaufman | 338/4 |
| 4,295,117 A | 10/1981 | Lake et al. | 338/4 |
| 4,368,575 A | 1/1983 | Erichsen et al. | 29/610 SG |

(List continued on next page.)

FOREIGN PATENT DOCUMENTS

| | | |
|---|---|---|
| JP | 5-332862 | 12/1993 |
| JP | 5-332865 | 12/1993 |
| JP | 5-332866 | 12/1993 |
| JP | 5-340828 | 12/1993 |
| JP | 6-174574 | 6/1994 |
| JP | 6-294691 | 10/1994 |
| SU | 1760388 | 9/1992 |
| WO | WO 94/01 041 A1 | 1/1994 |
| WO | WO 99/40405 | 8/1999 |

OTHER PUBLICATIONS

"Pressure Transmitter for High Purity Gases," EXACT Series, 5 pages (2/99).
"Micro–Baratron Pressure Transducers," Type 870 & Type 872, 5 pages (1999).

*Primary Examiner*—Edward Lefkowitz
*Assistant Examiner*—Octavia Davis
(74) *Attorney, Agent, or Firm*—Westman, Champlin & Kelly, P.A.

(57) ABSTRACT

A pressure transmitter for clean processing environments is disclosed. The pressure transmitter includes a process connector, a weld ring, a pressure sensor module, a frame, and a housing. The process connector is coupleable to a source of process fluid and directs process fluid to the pressure sensor module. The process connector is sealed to the pressure sensor module to couple process fluid to the pressure sensor. A weld ring is disposed about the pressure sensor module and provides a secondary process fluid seal. The pressure sensor module is electrically coupled to measurement circuitry to provide digital data indicative of process fluid pressure. The frame is coupled to the weld ring and the housing is coupleable to the frame and weld ring such that the housing rests upon the weld ring when secured in place. The pressure sensor module includes an isolator diaphragm that is operably coupled to a pressure sensor. The pressure sensor includes deflectable sensor diaphragm having elements thereon that provide an electrical characteristic that varies with diaphragm deflection. The isolating diaphragm and pressure sensor are separated from one another by a filler material. The filler material can be a polyurethane.

7 Claims, 6 Drawing Sheets

U.S. PATENT DOCUMENTS

| | | | | |
|---|---|---|---|---|
| 4,507,973 A | | 4/1985 | Barr et al. ..................... 73/724 |
| 4,785,669 A | | 11/1988 | Benson et al. ................ 73/718 |
| 4,875,135 A | | 10/1989 | Bishop et al. ............... 361/283 |
| 4,932,265 A | | 6/1990 | Skuratovsky et al. ......... 73/727 |
| 4,984,468 A | | 1/1991 | Hafner ......................... 73/727 |
| 5,056,373 A | | 10/1991 | Gray ....................... 73/861.71 |
| 5,115,676 A | | 5/1992 | Lee .............................. 73/706 |
| 5,125,275 A | | 6/1992 | Wilda et al. .................. 73/756 |
| 5,134,887 A | | 8/1992 | Bell .............................. 73/718 |
| 5,165,281 A | | 11/1992 | Bell .............................. 73/718 |
| 5,174,014 A | | 12/1992 | Erichsen et al. ........... 29/621.1 |
| 5,285,690 A | | 2/1994 | Koen et al. ................... 73/727 |
| 5,329,819 A | | 7/1994 | Park et al. .................... 73/724 |
| 5,461,922 A | * | 10/1995 | Koen ........................... 73/756 |
| 5,542,300 A | | 8/1996 | Lee .............................. 73/724 |
| 5,637,802 A | | 6/1997 | Frick et al. ................... 73/724 |
| 5,656,780 A | | 8/1997 | Park ............................. 73/724 |
| 5,661,245 A | | 8/1997 | Svododa et al. .............. 73/726 |
| 5,672,832 A | | 9/1997 | Cucci et al. ............. 73/861.52 |
| 5,693,887 A | | 12/1997 | Englund et al. .............. 73/723 |
| 5,731,522 A | | 3/1998 | Sittler .......................... 73/708 |
| 5,796,007 A | | 8/1998 | Panagotopulos et al. ...... 73/716 |
| 5,798,462 A | | 8/1998 | Briefer et al. ................ 73/722 |
| 5,808,206 A | | 9/1998 | Pandorf et al. ............... 73/756 |
| 5,811,685 A | | 9/1998 | Grudzien, Jr. ............... 73/724 |
| 5,852,244 A | | 12/1998 | Englund et al. .............. 73/706 |
| 5,861,558 A | | 1/1999 | Buhl et al. .................... 73/777 |
| 5,867,886 A | | 2/1999 | Ratell et al. ................... 29/595 |
| 5,899,962 A | | 5/1999 | Louwagie et al. .......... 702/138 |
| 5,911,162 A | | 6/1999 | Denner ........................ 73/718 |
| 5,915,281 A | | 6/1999 | Sparks ................. 73/862.581 |
| 5,939,639 A | | 8/1999 | Lethbridge ................... 73/724 |
| 5,942,692 A | | 8/1999 | Haase et al. .................. 73/724 |
| 5,965,821 A | | 10/1999 | Grudzien ..................... 73/724 |
| 5,974,893 A | | 11/1999 | Balcarek et al. .............. 73/714 |
| 6,003,380 A | | 12/1999 | Sasaki et al. ................. 73/720 |
| 6,009,757 A | | 1/2000 | LeComte et al. ............. 73/724 |
| 6,029,525 A | | 2/2000 | Grudzien ..................... 73/718 |
| 6,050,145 A | * | 4/2000 | Olson et al. .................. 73/706 |

* cited by examiner

PRESSURE TRANSMITTER FOR CLEAN ENVIRONMENTS

BACKGROUND OF THE INVENTION

This invention relates generally to pressure transmitters. More particularly, the present invention relates to a pressure transmitter for use in clean environments.

Certain industrial processes require relatively clean processing environments compared to general manufacturing processes. Examples of such clean processes include semiconductor manufacturing, pharmaceutical manufacturing, and food processing. In such environments, it becomes very important to ensure that all processing equipment can perform its required function without contaminating the process.

One device that has become highly useful in industrial processing environments is the pressure transmitter. A pressure transmitter is a device that senses fluid pressure within a process and provides an electrical signal indicative of the pressure to a control system. Generally, pressure transmitters have a pressure sensor that includes a deflectable diaphragm that deflects in direct response to pressure applied thereto, and which has an electrical structure on the diaphragm that varies its electrical characteristic in response to diaphragm deflection and thus pressure. Pressure transmitters that use a capacitive pressure sensor, are generally filled with a dielectric fill fluid that increases the capacitance of the pressure sensor to increase sensor resolution. However, in the event that such a sensor were to develop a leak, the dielectric fill fluid, which is occasionally silicone oil, would spill into the system thus contaminating the product. Therefore, industrial processes which require very clean environments generally do not tolerate pressure sensors that use a fill fluid. Thus, pressure transmitters designed for such clean environments are generally required to sense process fluid pressure without the benefit of a fill fluid.

Although a number of pressure transmitters are known for clean environments, there is an ongoing need to provide simply and cost effective pressure transmitters for use in clean environments.

SUMMARY OF THE INVENTION

A pressure transmitter for clean processing environments is disclosed. The pressure transmitter includes a process connector, a weld ring, a pressure sensor module, a frame, and a housing. The process connector is coupleable to a source of process fluid and directs process fluid to the pressure sensor module. The process connector is sealed to the pressure sensor module to couple process fluid to the pressure sensor. A weld ring is disposed about the pressure sensor module and provides a secondary process fluid seal. The pressure sensor module is electrically coupled to measurement circuitry to provide digital data indicative of process fluid pressure. The frame is coupled to the weld ring and the housing is coupleable to the frame and weld ring such that the housing rests upon the weld ring when secured in place.

The pressure sensor module includes an isolator diaphragm that is operably coupled to a pressure sensor. The pressure sensor can include a deflectable silicon diaphragm having elements thereon that provide an electrical characteristic that varies with diaphragm deflection. The isolating diaphragm and deflectable diaphragm are separated from one another by a filler material. The filler material can be a polyurethane.

DETAILED DESCRIPTION OF THE PREFERRED EMBODIMENTS

Figure 1:
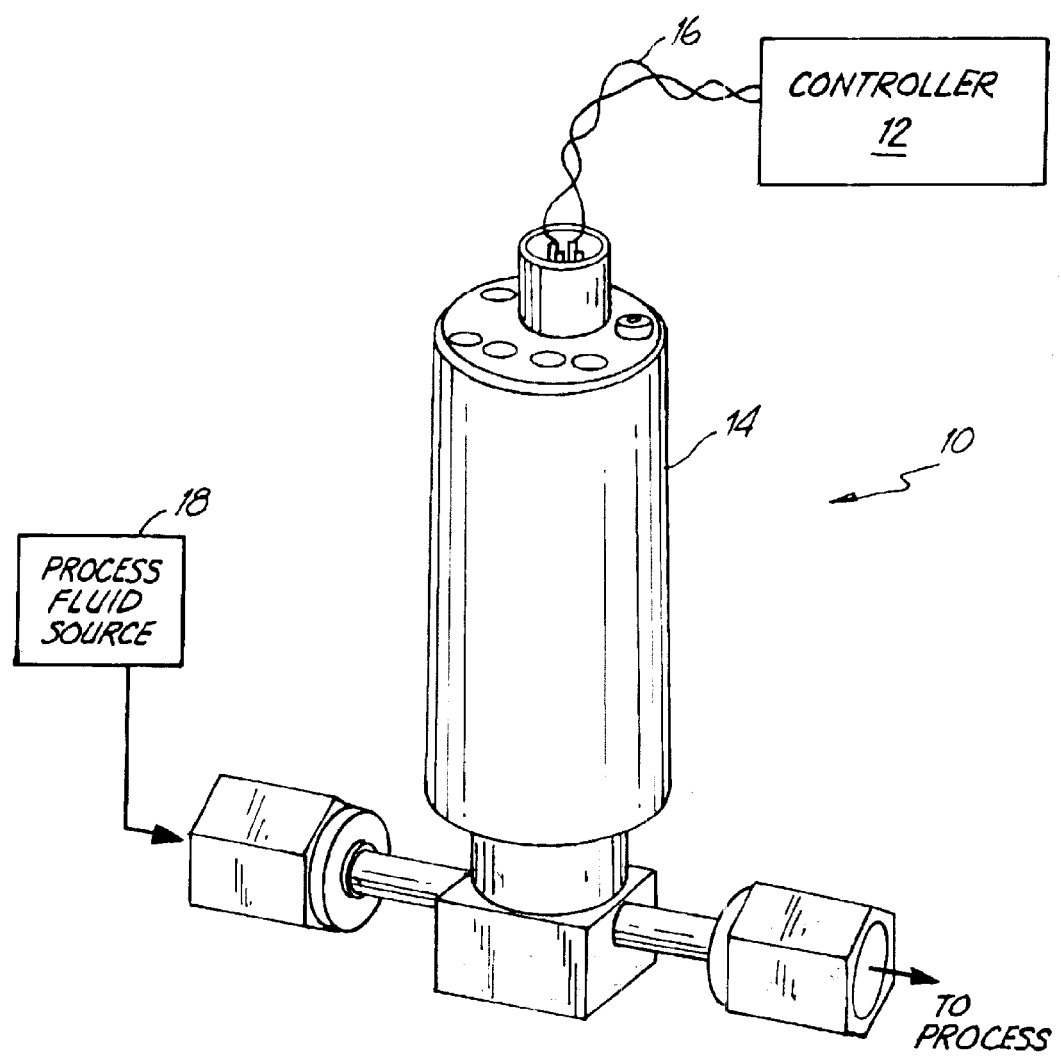
FIG. 1 is a diagrammatic view of a portion of a process control and measurement system.

FIG. 1 is a diagrammatic view of a portion of a process control and measurement system 10 that includes controller 12 coupled to high purity pressure transmitter 14 (HPT) via process communication loop 16. As illustrated, HPT 14 is coupled to fluid source 18 to receive process fluid and provide an indication of fluid pressure. HPT 14 is shown with a flow-through design since fluid from process fluid source 18 flows through HPT 14. Other embodiments where fluid does not flow through the HPT will be discussed later in the specification. Although a pair of conductors are illustrated diagrammatically connecting controller 12 to HPT 14, any suitable number of conductors may be used. Further, any suitable process communication protocol can be used to communicate between HPT 14 and controller 12 including, for example, the Highway Addressable Remote Transducer (HART®), FOUNDATION™ Fieldbus, or any other suitable protocol. Essentially, HPT 14 provides an indication to controller 12 of the pressure of process fluid flowing therethrough. HPT 14 performs such measurement in a manner that does not risk contaminating the process fluid flowing therethrough.

Figure 2:
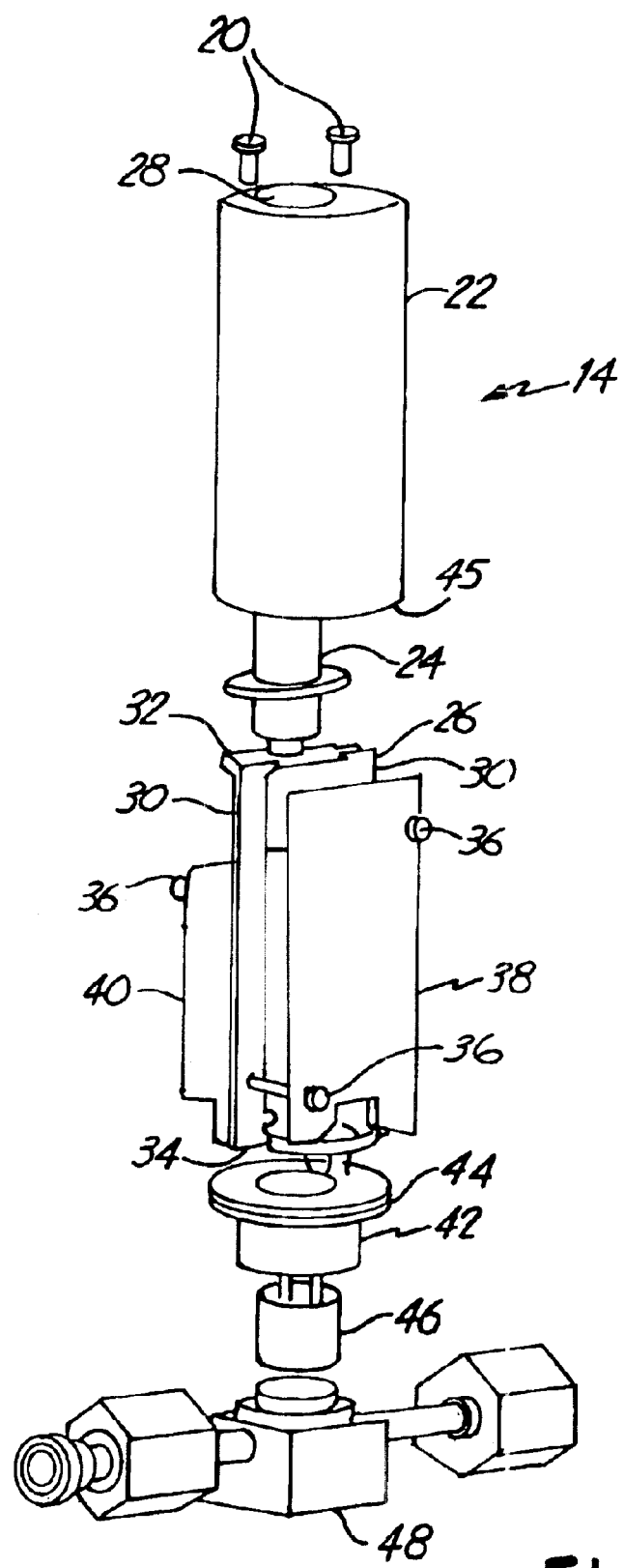
FIG. 2 is a perspective exploded view of a pressure transmitter in accordance with an embodiment of the present invention.

FIG. 2 is a perspective exploded view of HPT 14 in accordance with embodiments of the present invention. HPT 14 is shown having fasteners 20 removed so that housing 22 can be lifted to expose the interior of HPT 14. Connector 24 is coupled to frame 26 and remains below its mating hole 28 when enclosure 22 is lifted. Preferably, connector 24 is a Bendix™ connector. Frame 26 includes a pair of arms 30 that extend between ends 32 and 34. Standoffs 36 support multiple printed circuit boards 38, 40, which, in turn, support various circuits associated with HPT 14. Frame 26 is mounted to weld ring 42 which is preferably constructed from type 316L ferrite #3-10 stainless steel. Weld ring 42 includes an annular lip 44 that contacts bottom surface 45 of housing 22 when housing 22 is fully seated downwardly. Weld ring 42 surrounds and mounts sensor module 46 which sits atop process connector 48.

Preferably, all components of HPT 14 are selected in accordance with the requirements of Semiconductor Equipment and Materials International Standards (SEMI). Thus, process connector 48 is preferably type 316 L stainless steel Vacuum Arc Remelt (VAR). Likewise, the diaphragm within sensor module 46 (not shown) is preferably constructed from the same material. Housing 22 is formed from type 304 stainless steel, and frame 26 is preferably constructed from aluminum or plastic. Those skilled in the art will appreciate that a number of materials may be selected in accordance with SEMI, and that the above noted materials are merely one specific combination thereof.

Process connector 48 is machined and smoothed by honing to get a minimum surface roughness value of 10 Ra. Sensor module 46 and weld ring 42 are welded together to form a sensor/weld ring assembly that is electro-polished before or after the weld process to ensure that a surface finish of less than 7 Ra is achieved, and to further ensure that the required metallurgy is present on the surface. Frame 26 is then affixed to weld ring 42 after which circuit cards 38, 40 are mounted upon frame 26. Once cards 38, 40 are so mounted, electrical connections between sensor module 46 and circuit cards 38, 40 are effected. Preferably, such electrical connections are via flex cable. Next, connector 24 is positioned on top of frame 26 and is electrically coupled to circuit cards 38, 40 via a multi-wire electrical cable. Once connector 24 is so coupled, housing 22 is assembled and screws 20 are used to secure housing 22 and connector 24 to frame 26.

Figure 3:
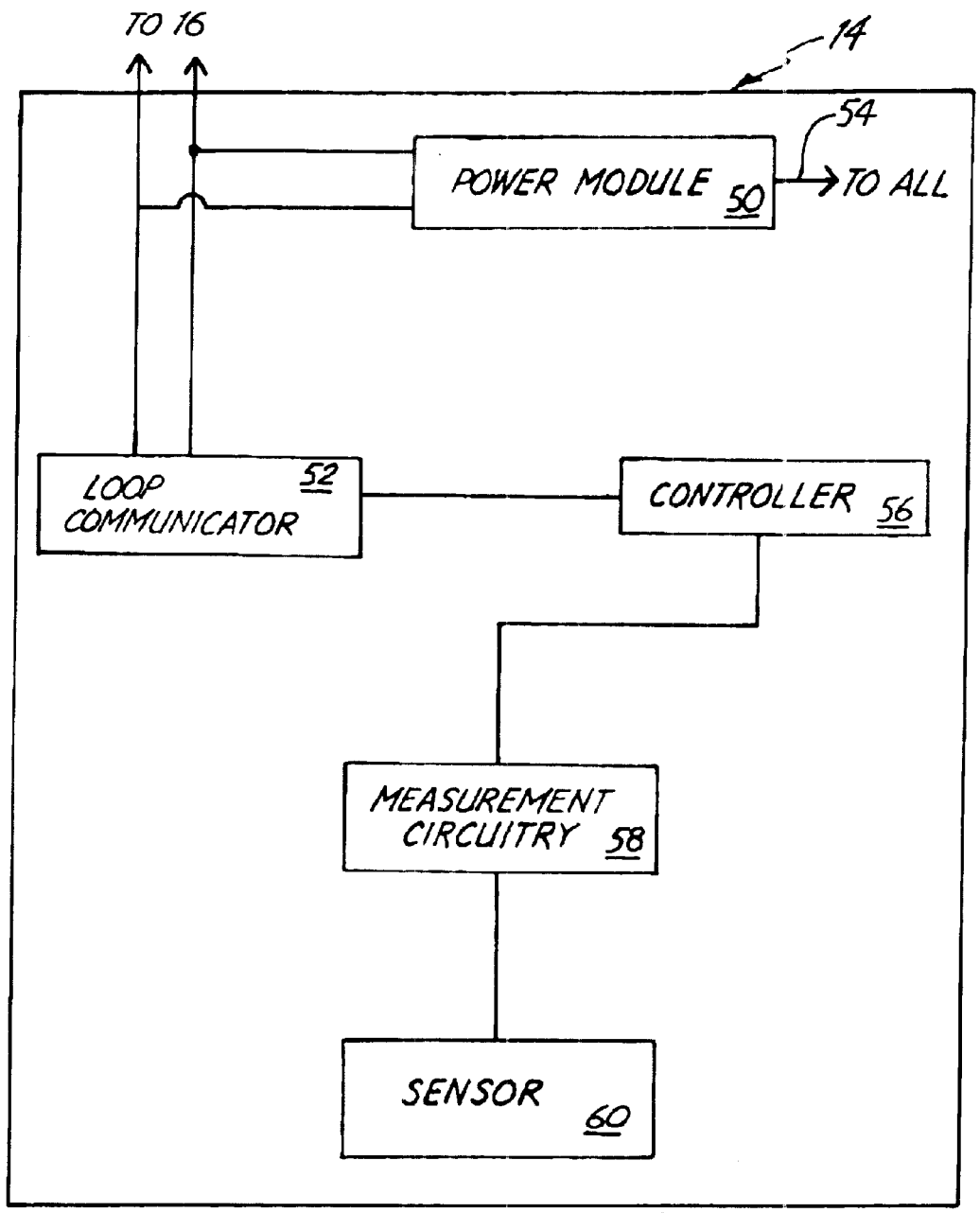
FIG. 3 is a system block diagram of a pressure transmitter in accordance with an embodiment of the present invention.

FIG. 3 is a system block diagram of HPT 14 in accordance with the present invention. HPT 14 includes power module 50 and loop communicator 52, each of which is adapted to couple to process communication loop 16. Power module 50 receives energy from loop 16 and provides electrical power to all components of HPT 14 as indicated by arrow 54 labeled to all. Loop communicator 52 is also coupleable to process communication loop 16 and is adapted for bi-directional communication over loop 16. Loop communicator 52 is coupled to controller 56 such that loop communicator 52 can provide data to controller 56 indicative of process communication signals received from loop 16. Conversely, loop communicator 52 can receive data from controller 56 and generate suitable process communication signals on loop 16. Controller 56 is coupled to measurement circuitry 58 which is, in turn, coupled to sensor 60. In the preferred embodiment, sensor 60 is a piezoresistive element that has an electrical property which varies with diaphragm deflection. A more detailed description of sensor 60 will be described with respect to FIG. 4. Measurement circuitry 58 includes suitable circuitry to measure the varying electrical characteristic of sensor 60 and provide data to controller 56 indicative of process fluid pressure. Preferably, measurement circuitry 58 includes an analog-to-digital converter adapted to convert a voltage indicative of the pressure acting upon sensor 60, into digital data that is transmitted to controller 56.

Figure 4:
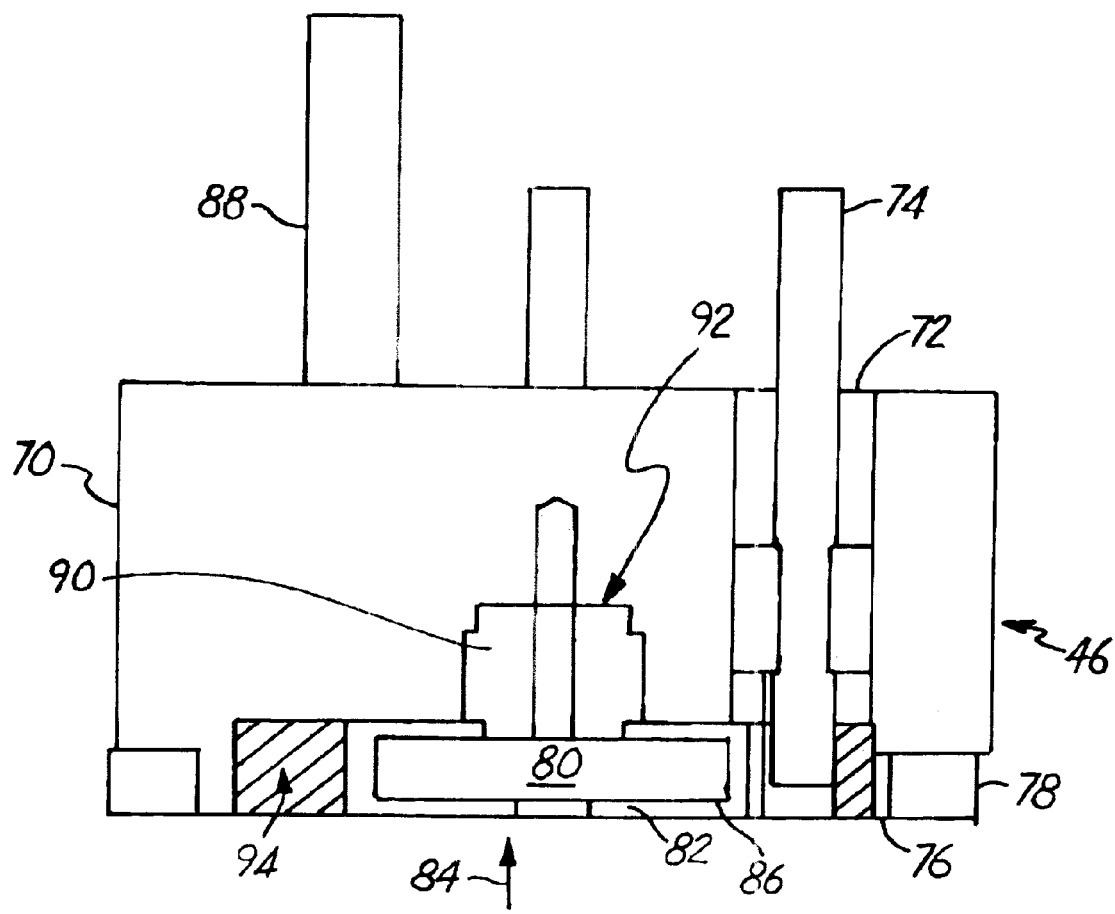
FIG. 4 is a side sectional view of a sensor module in accordance with an embodiment of the present invention.

FIG. 4 is a side sectional view of sensor module 46 in accordance with an embodiment of the present invention. Sensor module 46 includes header assembly 70 which has a plurality of bores 72 extending therethrough to allow connection posts 74 to pass through. Sensor module 46 includes isolating diaphragm 76 that is welded to ring member 78 which is coupled to header assembly 70. Isolating diaphragm 76 is preferably constructed from type 316L VAR stainless steel. Isolating diaphragm 76 is coupled to sensor 80 via filler material 82. Process fluid acts upon isolator diaphragm 76 in the direction of arrow 84. Such pressure is transmitted through filler material 82 and causes sensor 80 to deflect. Sensor 80 preferably includes a deflectable silicon diaphragm having one or more piezoresistors disposed on at least one surface, which have an electrical characteristic that varies in response to sensor deflection. Such piezoresistors are well known in the art. Passthrough connector 74 is coupled to bonding wire 86 such that passthrough connector 74 allow electrical access to the piezoresistors disposed on sensor 80. Sensor module 46 also includes tube 88 which initially is in fluidic communication with the opposite side of sensor 80. By venting tube 88 to atmospheric pressure, sensor module 46 can be adapted to sense gage pressure. Additionally, in some embodiments, a vacuum is coupled to tube 88 which is then sealed such that a permanent vacuum exists within sensor module 46 thus transforming sensor module 46 into an absolute pressure sensor.

Sensor 80 is disposed proximate pedestal 90. The top side of pedestal 90 is preferably bonded to header assembly 70 via a suitable bond 92. Spacer 94 is also disposed within sensor module 46.

The selection of filler material 82 is relatively important for the long term viability of sensor module 46. For example, if material 82 is too rigid, it will counteract, to some extent, the pressure forces of the process fluid, thereby reducing the sensitivity of sensor module 46. Additionally, if the adhesive bonds between filler material 82 and sensor 80, or between filler material 82 and isolator diaphragm 76 should disengage, or otherwise delaminate, such condition can introduce undesirable errors since deflection of isolator diaphragm 76 may not necessarily result in the appropriate deflection of sensor 80. Further still, it is important that the mechanical characteristics of filler 82 be relatively stable over the thermal operating range of HPT 14 such that temperature does not introduce unwanted variance into pressure measurement. Finally, a selection of filler material 82 should facilitate quick and robust manufacture of sensor module 46 such that high yields can be achieved while minimizing manufacturing costs.

A number of different elastomers have been tested as filler material 82. Such materials include Conathane DPEN-15631 Blue available from (Conap, Inc. of Olean, N.Y.); RTVS 27; GE 630 (available from GE Silicones, of (Waterford, N.Y.); Oxy-Bond 1214 (Resin Technology Group, LLC. of South Easton, Mass.); Master Bond EP30-FL (available from Master Bond Inc. of Hackensack, N.J.); Insulcast 781 (available from Permagile Industries Inc. of Plainview, N.Y.); Insulgel 50 (available from Permagile Industries Inc.); Conathane EN-11 (Conap Inc.); Conathane EN-7 (available from Conap Inc.); Biwax 821051 (available from Loctite Corporation, of Commerce City, Colo.); and Conathane EN-2523 (available from Conap Inc.). However, two specific substances proved superior for the function of filler 82. Specifically, polyether aromatic polyurethane having a durometer of approximately 91 Shore A, proved superior. Examples of such polyurethane include ST-1890-91, and ST-1880-87 (both of which are available from Steven's Urethane of Holyoke, Mass.). Using the preferred polyurethane as filler 82, which is generally shipped in sheet form, portions can be cut that fit precisely into module 46 before the isolator diaphragm assembly is mounted thereto. Subsequently, pressure is applied to isolator diaphragm 76 and sensor module 46 is heated to approximately 200 degrees Celsius to cause the polyurethane to flow. As filler material 82 cools, it bonds to sensor 82 and isolator diaphragm 76. Preferably, approximately 20 pounds per square inch of pressure is applied to isolator diaphragm 76 during the heating process. The resulting filler 82 is stable over a wide temperature range and appears to enhance a sensor of longevity.

Figure 5:
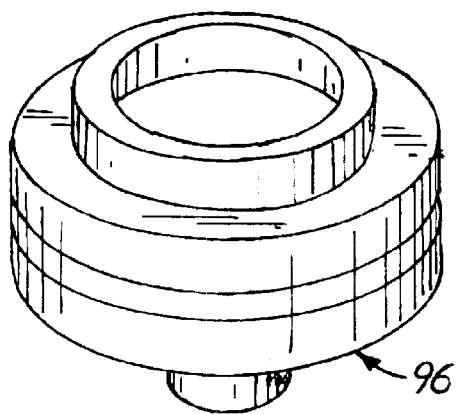
FIG. 5 is a perspective view of a dead end process connector.

FIG. 5 is a perspective view of dead end process connector 96. For embodiments where flow through pressure measurement is not required, dead end process connector 96 is substituted for flow through process connector 48 resulting in an assemblies that appear in FIGS. 6A and 6B. Aside from the different process connector, the transmitters shown in FIGS. 6A and 6B are the same as that shown in FIG. 1.

Figure 6A:
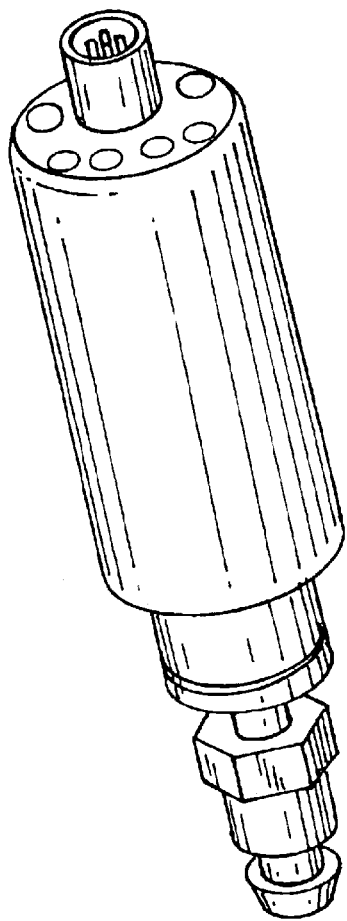
FIGS. 6a and 6b are perspective views of pressure transmitters in accordance with embodiments of the present invention.
Figure 6B:
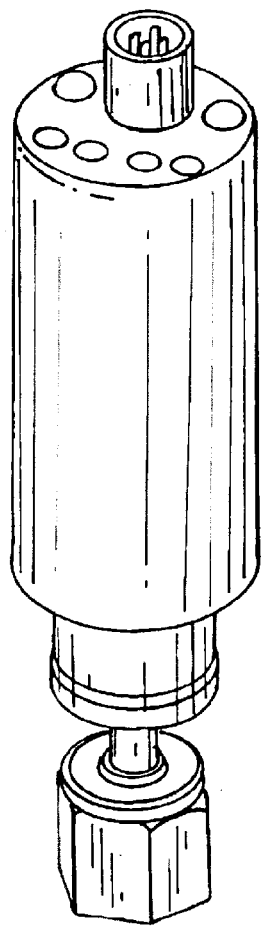

FIGS. 6A and 6B illustrate transmitters that incorporate the dead end process fluid connector 96 shown in FIG. 5. It should be noted that other process fluid connectors such as a modular connector can also be used with embodiments of the present invention. As shown in FIGS. 6A and 6B, the transmitters can include VCR fittings (male in FIG. 6A and female in FIG. 6B). However, a variety of other suitable process fittings can also be used.

Figure 7:
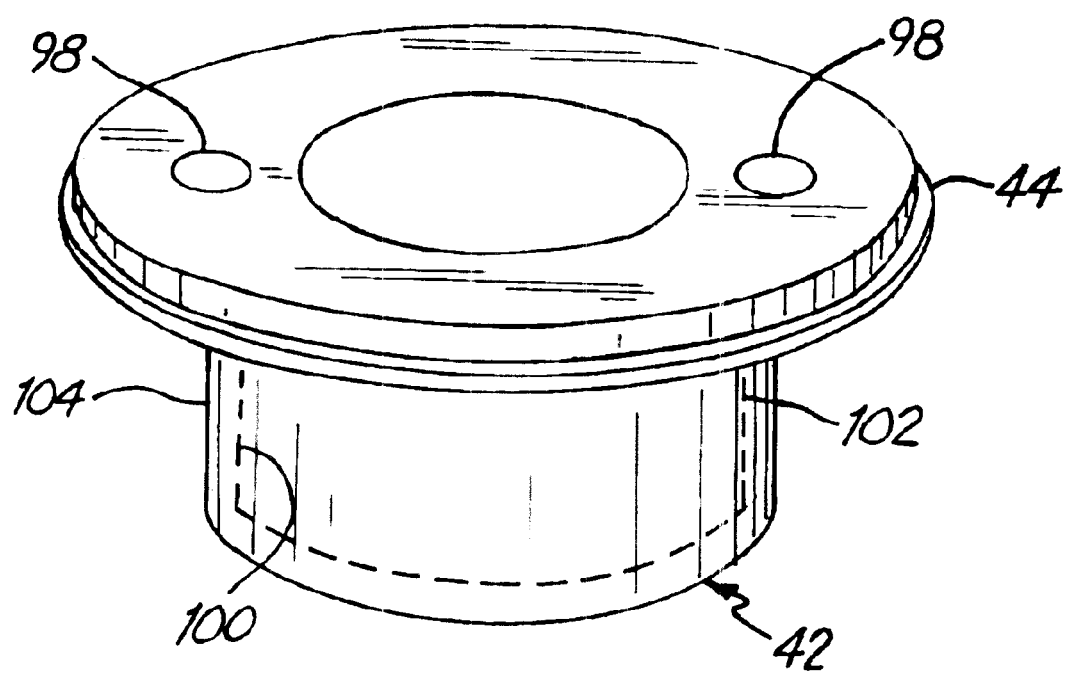
FIG. 7 is a perspective view of a weld ring in accordance with an embodiment of the present invention.

FIG. 7 is a perspective view of weld ring 42. As can be seen in FIG. 7, weld ring 42 includes annular lip portion 44 upon which surface 46 of housing 42 rests. Additionally, FIG. 7 shows a plurality of mounting holes 98 which facilitate mounting frame 26 thereon. As illustrated, weld ring 42 includes internal bore 100 that is sized to fit over sensor module 46. Additionally, weld ring 42 also includes flared portion 102 that flares from outer diameter 104 of weld ring 42 to annular lip portion 44. By providing flared portion 102, weld ring 42 can provide the function of creating a second process fluid seal, while simultaneously providing a surface upon which housing 22 can mount.

Although the present invention has been described with reference to preferred embodiments, workers skilled in the art will recognize that changes may be made in form and detail without departing from the spirit and scope of the invention.

What is claimed is:

1. A pressure transmitter for a clean environment, the pressure transmitter comprising:
   a process coupling coupleable to a source of process fluid;
   a pressure sensor module coupled to the process coupling for fluidic communication with the process fluid, the pressure sensor module having an electrical characteristic that varies with process fluid pressure;
   measurement circuitry operably coupled to the pressure sensor module, the measurement circuitry being adapted to provide a signal based upon at least one measurement of the electrical characteristic;
   communication circuitry coupled to the measurement circuitry and adapted to provide pressure-related information to a process control loop; and
   wherein the pressure sensor module further includes:
      an isolator diaphragm positioned to contact the process fluid;
      a deflectable sensor diaphragm pressure sensor disposed within the pressure sensor module; and
      filler material disposed between the isolator diaphragm and the sensor diaphragm, wherein the filler material is constructed from an elastomer.

2. The transmitter of claim 1, wherein the elastomer is polyurethane.

3. The transmitter of claim 2, wherein the polyurethane filler material is polyether aromatic polyurethane.

4. The transmitter of claim 2, wherein the filler material is ST-1890-91 polyurethane.

5. The transmitter of claim 2, wherein the filler material is ST-1880-87 polyurethane.

6. The transmitter of claim 1, wherein the filler is bonded to both the isolator diaphragm and the sensor diaphragm.

7. The transmitter of claim 1, wherein all materials of the transmitter are selected in accordance with requirements of Semiconductor Equipment and Materials International standards (SEMI).

* * * * *

UNITED STATES PATENT AND TRADEMARK OFFICE
CERTIFICATE OF CORRECTION

PATENT NO. : 6,782,754 B1
DATED : August 31, 2004
INVENTOR(S) : Broden et al.

It is certified that error appears in the above-identified patent and that said Letters Patent is hereby corrected as shown below:

Title page,
Item [73], Assignee, "Rosemount, Inc." should be -- Rosemount Inc. --

Signed and Sealed this

Eighteenth Day of January, 2005

JON W. DUDAS
*Director of the United States Patent and Trademark Office*